INVENTOR.
LOUIS SCHWAB
BY Hane and Baxley
ATTORNEYS

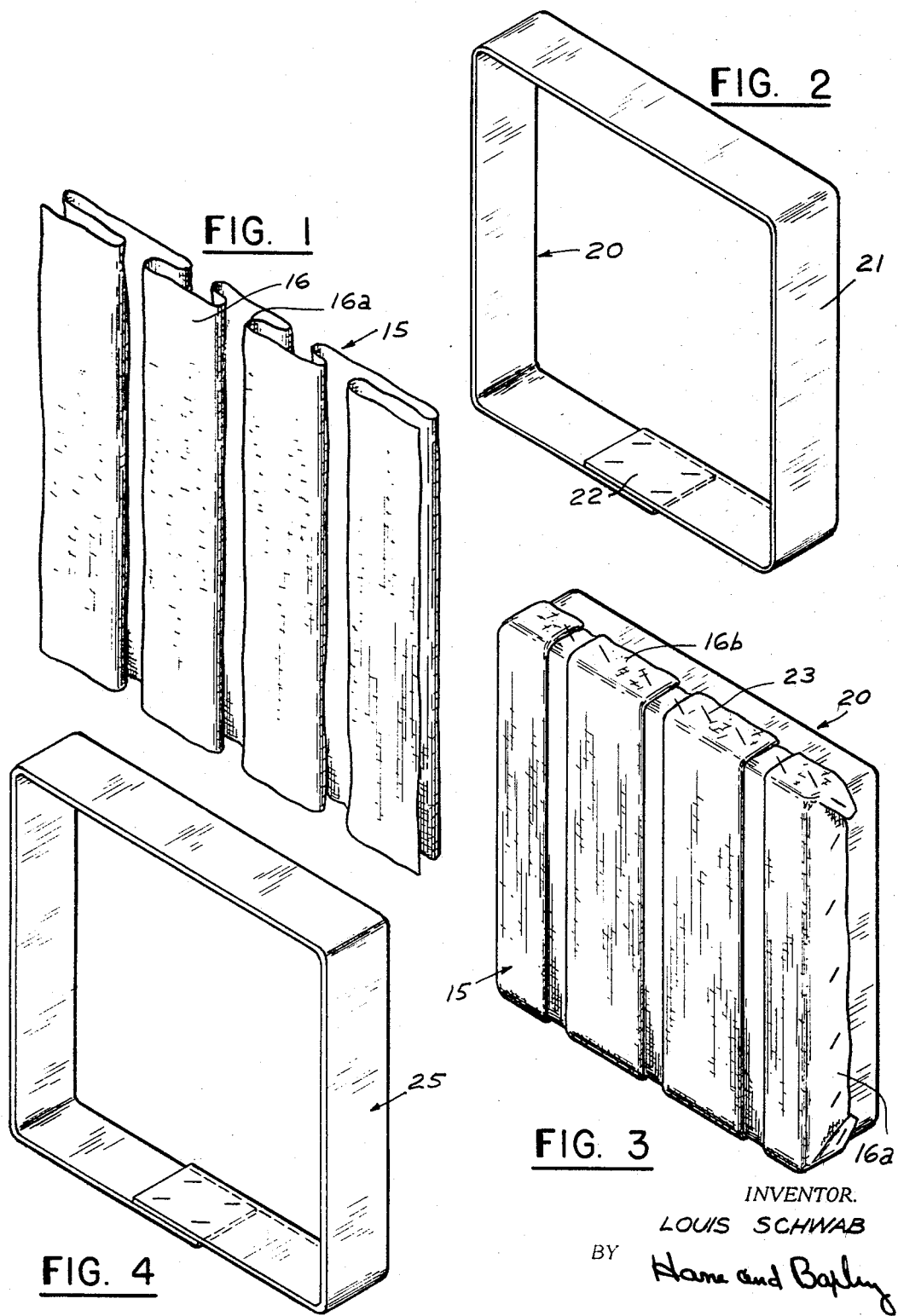

Oct. 28, 1969     L. SCHWAB     3,474,599
FILTER ASSEMBLAGE FOR PURIFYING A PARTICLE-LADEN GASEOUS FLOW
Filed Jan. 4, 1968     3 Sheets-Sheet 3

INVENTOR.
LOUIS SCHWAB
BY Hane and Bayley
ATTORNEYS

United States Patent Office 3,474,599
Patented Oct. 28, 1969

3,474,599
FILTER ASSEMBLAGE FOR PURIFYING A PARTICLE-LADEN GASEOUS FLOW
Louis Schwab, P.O. Box 575, Miami Beach, Fla. 33139
Filed Jan. 4, 1968, Ser. No. 695,701
Int. Cl. B01d 46/52
U.S. Cl. 55—497          8 Claims

ABSTRACT OF THE DISCLOSURE

A filter assemblage in which pleated soft fiber material is stretched across the rim of an open ended filter frame and overhanging filter material is secured to the outside walls of the frame. When a particle-laden gaseous flow such as a dust laden air flow is directed upon the upstream side of the filter the pleats thereof are partly inflated thus correspondingly increasing the available filter area. A strip of rubberized fabric or other suitable material is preferably wrapped about the outside of the frame walls. Due to the bulkiness of the underlying filter material on the outside of the frame walls, the strip is forced into a slightly slanted position and such slant is utilized to wedge the filter frame into a carrier frame.

---

Figure 5:
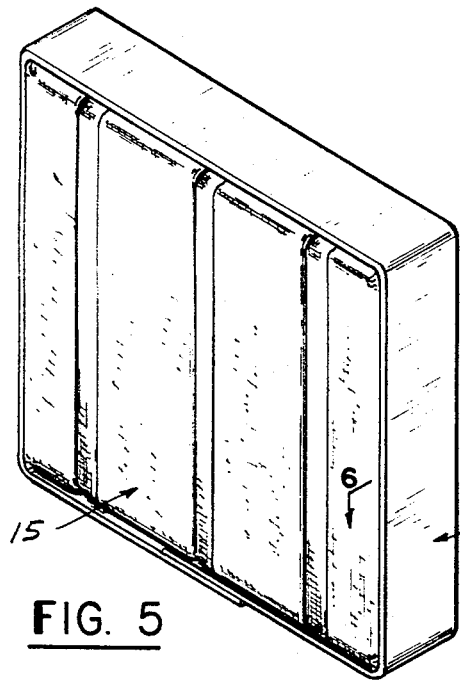

The present specification relates to a filter assemblage for separating solid particles such as dust particles entrained in a flow of gaseous fluid such as air. More particularly, the invention relates to a filter assemblage in which a filter made of soft, that is, nonform retaining material is flatly held by an open-ended form-retaining frame.

It is an object of the invention to provide a novel and improved filter assemblage of the general kind above referred to the frame of which accommodates a much frame possesses a much larger effective filter area than flat filters as heretofore known.

It is also an object of the invention to provide a novel and improved filter assemblage of the general kind above referred to the frame of which accammodates a much larger effective area of filter material than frames of conventional flat filters of this type.

A more specific object of the invention is to provide a novel and improved filter assemblage which automatically deflects the air flow from already heavily dust laden areas to less laden or clean areas thereby assuring full utilization of the total available filter area and a high and substantially constant filtering efficiency until all the filter material is exhausted by being clogged with trapped dust particles.

Another more specific object of the invention, allied with the next preceding one, is to provide a novel and improved filter assemblage in which the impact of an air flow upon the upstream side of the filter inflates the pleats in the filter material to effect the aforementioned deflection of the air flow.

Still another more specific object of the invention is to provide a novel and improved filter assemblage in which the maximal deformation of the filter material due to inflation of the pleats therein is limited to the depth of the frame on which the filter material is mounted.

A further more specific object of the invention is to provide a novel and improved filter assemblage the filter material of which while soft has due to its mounting on the frame sufficient rigidity so that reinforcement means such as struts or stretched wires are not needed.

A still further more specific object of the invention is to provide a novel and improved filter assemblage in which the filter material is secured to the outside of the frame thus obtaining maximal utilization of the area bounded by the frame and the outside of the frame is covered by a strip slightly slanted in reference to the frame walls whereby the filter frame can be wedged into a carrier frame so that the filter frame is safely but releasably retained in the carrier frame and is sealed against the same.

It is also an object of the invention to provide a novel and improved filter assemblage of the general kind above referred to which while highly efficient can be very inexpensively manufactured so that it is economic to discard the entire assemblage after the filter material has become clogged.

Other and further objects, features and advantages of the invention will be pointed out hereinafter and set forth in the appended claims constituting part of the application.

Summary of the invention

The invention resides in providing a highly efficient filter assemblage of the flat filter type which has a very large effective filtering area for its overall size by mounting on a substantially rigid frame soft pleated filter material across the rim on one side of an open-ended frame and securing overhanging filter material to the outside of the frame walls. An air flow directed upon the upstream side of the filter will partly inflate the pleats therein thereby correspondingly increasing the available filter area. A collar or cover frame preferably envelopes the outside of the frame. Due to the bulkiness of the underlying filter material secured to the outside of the frame the cover is forced at least partly into a position slightly slanted toward the opposite end of the filter frame whereby the same can be safely and tightly wedged into a carrier frame.

In the accompanying drawing a preferred embodiment of the invention is shown by way of illustration and not by way of limitation.

Figure 6:
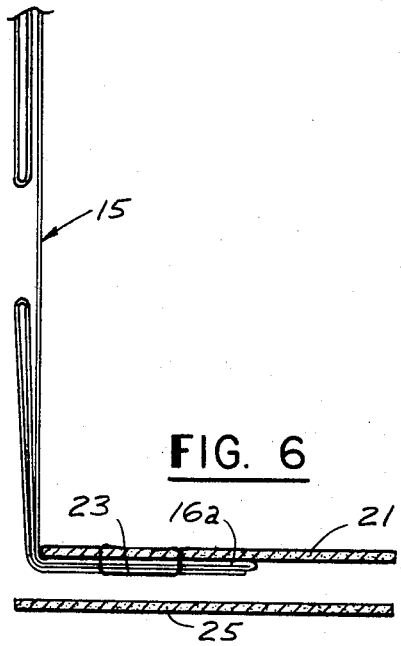
Figure 7:
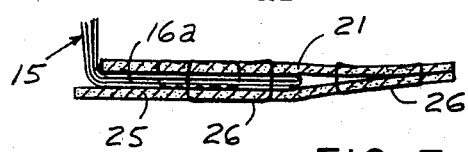
Figures 11, 12:
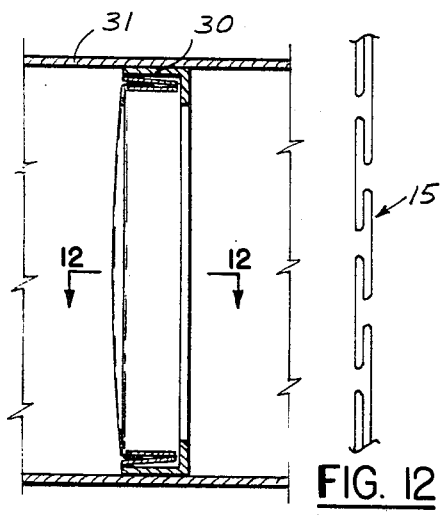
Figures 13, 14:
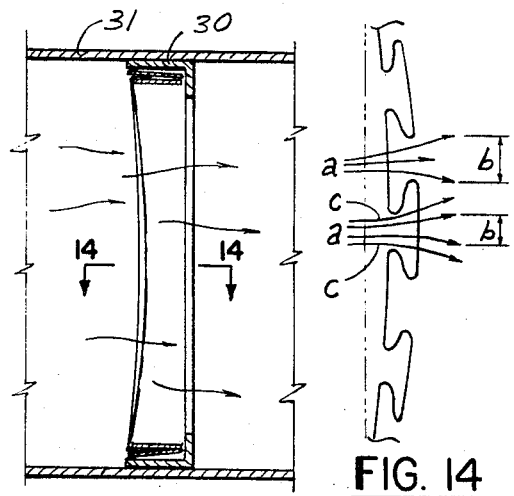
Figure 8:
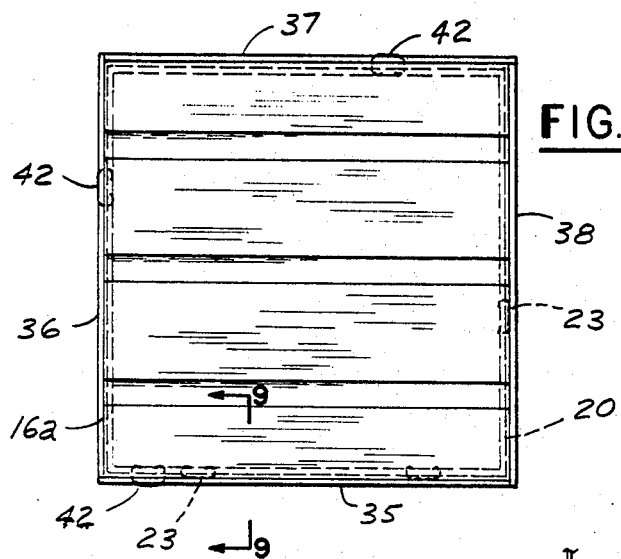
Figure 9:
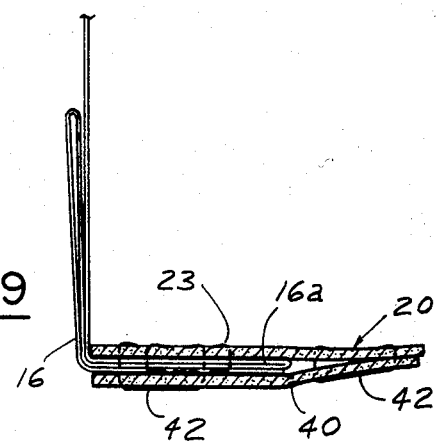
Figure 10:
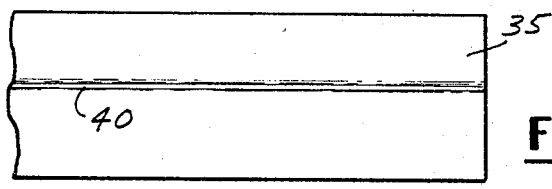

In the drawing:
  FIG. 1 is a perspective view of pleated filter material;
  FIG. 2 is a perspective view of a frame for mounting the filter material;
  FIG. 3 is a perspective view of the frame of FIG. 2 with the filter material of FIG. 1 secured thereto;
  FIG. 4 is a perspective view of a cover strip fittable upon the filter frame of FIG. 3;
  FIG. 5 is a perspective view of the filter frame with the cover strip of FIG. 4 enveloping the frame;
  FIG. 6 is a section taken on line 6—6 of FIG. 5 on an enlarged scale;
  FIG. 7 is a section similar to FIG. 6 but with the cover strip secured to the filter frame;
  FIG. 8 is an elevational front view of a filter assemblage including a modified cover frame;
  FIG. 9 is a section taken along line 9—9 of FIG. 8;
  FIG. 10 is a view upon one part of the cover frame according to FIGS. 8 and 9;
  FIG. 11 is a diagrammatic view of the filter assemblage fitted in a carrier frame which, in turn, is inserted in a flow duct;
  FIG. 12 is a fragmentary section taken on line 12—12 of FIG. 11;
  FIG. 13 is a sectional view similar to FIG. 11 and showing the effect of a gaseous flow directed upon the upstream side of the filter assemblage; and
  FIG. 14 is a fragmentary section taken on line 14—14 of FIG. 13.

Referring now to the figures more in detail, the filter material used in the exemplified filter assemblage is a pliable soft material, that is, a permeable non-form retaining suitable material such as Dynel industrial cloth, nylon cloth or reinforced cotton fabric. If desired, the filter material can be flame-proofed by techniques siutable and known for the purpose. The density of the filter material is selected in accordance with the particular gaseous flow to be purified and the acceptable pressure drop between the upstream side and the downstream side of the filter.

As is clearly shown in FIG. 1 a sheet 15 of filter material is formed with a plurality of parallel pleats 16. While single pleats may be used, oppositely facing double pleats are generally preferable. As is shown in FIG. 1, the fold lines 16a of the pleats on each side of the filter material face a fold line of the next adjacent pleat. Moreover, as is also shown, the configuration of the pleats is the same on both sides of the filter material for a purpose which will be more fully described hereinafter.

The filter material is stretched across one end of an open-ended frame 20. The frame is made of a material of sufficient rigidity and which is inexpensive, light in weight and easy to shape. It has been found to be convenient and practical to bend a strip 21 of pressed cardboard to the desired shape and to secure the ends of the strip to each other, for instance by stapling overlapping end portions as is indicated at 22.

It is generally preferable to pleat the filter sheets prior to securing the same to the frame but the pleating can also be applied while the sheet material is being secured to the frame.

As is shown in FIG. 3 marginal portions 16b of the filter material are bent over the outside of the frame walls and suitably secured thereto. While the filter material may be glued to the frame, the use of fastening means such as staples is generally preferable for reasons of economy. As is indicated in FIG. 3 staples 23 secure the filter material to the frame and these staples are so disposed that each of the pleats is retained in position.

The filter assemblage as shown in FIG. 3 can be inserted in a carrier frame for installment in an air duct or other installation where the filter assemblage is to be used. However, it is generally preferable to cover the outside walls of frame 21. For this purpose a strip made of a suitable pliable material such as rubberized fabric may be wrapped around the outside walls, or as shown in FIG. 4 the cover may be in the form of a frame 25 made of a material sufficiently rigid to retain its form but pliable enough to be bent for a purpose which will become apparent from the subsequent description.

FIGS. 5 and 6 show the cover applied to the filter frame but not secured thereto as yet.

FIG. 7 shows the cover fastened to the filter frame by suitable fastening means such as staples 26. As is shown in FIG. 7 and as is also evident, the cover whether it is in the form of a wrap around strip or in the form of the frame 25 is forced into a somewhat slanted position due to the bulkiness of the underlying filter portions 16b. More specifically, the cover strip is slightly tapered from the end of frame 20 across which the filter material is stretched toward the other end of the frame.

Referring now to FIGS. 8, 9 and 10, the filter assemblage as shown in FIGS. 8 and 9 is the same as the previously illustrated assemblage with respect to the pleated filter material and the filter frame 20 upon which it is mounted with overlap.

The cover frame according to FIGS. 8 to 10 inclusive, is formed by four strips 35, 36, 37 and 38 of a substantially stiff material such as pressed cardboard or solid fiberboard. As previously explained, it is desirable that the cover frame is slightly tapered toward the free edge of filter frame 20 to obtain a wedge action when the assemblage is fitted into an outer mounting frame as will be more fully described hereinafter. While the aforedescribed cover frames are made of comparatively pliable material, the frame according to FIGS. 8, 9 and 10 is presumed to be too stiff to be readily bent. Accordingly, it has been found to be advantageous to provide a lengthwise fold or score line 40 which facilitates bending the strips into the position shown in FIG. 9.

Each of the frame strips is secured to the respective side wall of filter frame 20 by suitable fastening means such as staples 42.

The now completed filter assemblage is inserted into a carrier frame 30 of generally conventional design. This frame should be visualized as being sturdily built as it is intended for permanent use. Due to the aforedescribed slant of the cover, the filter frame is received in the carrier frame with a wedge action. As a result, the filter frame is safely retained in position and also sealed against the side walls of the carrier frame. Such wedging of the filter frame into the carrier frame has, on one hand, the advantage of a very convenient mounting as it does not require a specific assembly operation and on the other hand, it permits an equally convenient removal of a used-up filter frame from carrier frame 30 by simply pushing it out of the carrier frame.

The carrier frame with the filter assemblage therein is shown to be installed in a duct 31 for filtering an air flow passing through the duct. Depending upon the cross-section of the duct one or several side by side disposed filter assemblages may be provided to cover the entire cross-section of the duct.

FIGS. 11 and 12 show the general configuration of the filter material 15 in the absence of an air flow acting thereupon. When now an air flow is directed upon the upstream side of the filter as is indicated in FIG. 13 the folds in the filter material will become partly inflated as shown in FIG. 14. Obviously, the extent of the inflation depends upon the velocity of the air flow, the stiffness of the filter material and the density thereof. Clearly, the major portion of the air flow will tend to pass through the filter areas which offer the least resistance. Assuming that the entire filter material is still clean, some of these areas are indicated by arrows a. Accordingly, these areas will be the first ones which become more or less saturated with dust as is indicated for filter areas b thereby causing a high pressure drop between the upstream side and the downstream side of the filter materials. As a result, at least part of the air flow is deflected toward the still substantially clean areas adjacent to the now high resistance areas b as is indicated by arrows c.

As is now evident, the inflation of the filter material by the pressure of the gaseous flow results in two important advantages:

(1) It increases the available total filter area bounded by frame 21.

(2) It causes the air flow to utilize the entire available filter area rather than to leave pockets of heavily clogged areas and pockets of still comparatively clean areas.

While the invention has been described in detail with respect to a certain now preferred example and embodiment of the invention, it will be understood by those skilled in the art, after understanding the invention, that various changes and modifications may be made without departing from the spirit and scope of the invention.

What is claimed is:

1. A filter assemblage for trapping discrete particles entrained in a gaseous fluid flow, said assemblage comprising in combinations:

an open-ended box frame including outer walls of substantially rectangular outline and made of self-supporting material one end of the frame constituting the upstream side and the other end of the downstream side of the frame;

a layer of pliable non-form sustaining flow permeable filter material including a plurality of side-by-side and mutually parallel flattened double pleats substantially disposed in a common plane, each of said pleats defining a lengthwise entry slot into the respective pleat and said slots facing alternately in opposed relationship with reference to the downstream side and the upstream side respectively of the frame, said filter material layer covering the upstream side of the frame tautly and flatly stretched thereupon, with marginal portions of the filter material layer overlying the respective edge of the outer walls of the frame whereby pleats facing with their slots at the upstream side of the frame are inflatable by the impact of fluid flow impinging thereupon;

fastening means fixedly securing the overlying portions of each pleat of filter material to the outside walls of said frame; and a cover frame retaining said box frame and enveloping the outer walls of said frame and covering the secured overlying marginal portions of the filter material.

2. A filter assemblage according to claim 1 wherein said fastening means comprise staples driven through the overlying filter material into the material of the outer walls.

3. A filter assemblage according to claim 1 wherein said cover frame is slightly slanted toward the downstream side of the box frame.

4. A filter assemblage according to claim 1 wherein said cover frame is formed of a pliable strip.

5. A filter assemblage according to claim 4 wherein said strip is made of rubberized fabric.

6. A filter assemblage according to claim 1 wherein said cover frame comprises four cover strips each secured to one of the sides of the filter frame substantially coextensive therewith.

7. A filter assemblage according to claim 6 wherein each of said cover frame strips is made of a substantially rigid material.

8. A filter assemblage according to claim 7 wherein each of said cover frame strips includes a lengthwise fold line intermediate the width of the strip.

References Cited

UNITED STATES PATENTS

| | | | |
|---|---|---|---|
| 2,048,911 | 7/1936 | Zimmerman. | |
| 2,502,560 | 4/1950 | Dahlman | 55—500 |
| 2,537,992 | 1/1951 | Gross et al. | 55—498 |
| 3,142,550 | 7/1964 | Kuehne. | |
| 3,144,315 | 8/1964 | Hunn | 55—500 |
| 3,164,456 | 1/1965 | Brainerd et al. | 55—499 |
| 3,258,900 | 7/1966 | Harms | 55—500 |
| 3,273,321 | 8/1966 | Bauder et al. | 55—341 |
| 3,296,781 | 1/1967 | Schumann | 210—493 |
| 3,389,031 | 6/1968 | Rosaen et al. | 210—493 |
| 2,160,003 | 5/1939 | Slayter et al. | 55—491 |
| 2,869,680 | 1/1959 | Fields | 55—354 |
| 2,988,168 | 6/1961 | Wittemeier et al. | |

FOREIGN PATENTS 656,164  1/1938  Germany.

HARRY B. THORNTON, Primary Examiner

BERNARD NOZICK, Assistant Examiner

U.S. Cl. X.R.

55—500, 521, 511; 210—493